US012639572B2

(12) United States Patent
Tanach

(10) Patent No.: US 12,639,572 B2
(45) Date of Patent: *May 26, 2026

(54) REMOTE ARTIFICIAL INTELLIGENCE (AI) ACCELERATION SYSTEM

(71) Applicant: NeuReality LTD., Caesarea (IL)

(72) Inventor: Moshe Tanach, Bet Herut (IL)

(73) Assignee: NeuReality LTD., Caesarea (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/396,277

(22) Filed: Dec. 26, 2023

(65) Prior Publication Data

US 2024/0127054 A1 Apr. 18, 2024

Related U.S. Application Data

(63) Continuation of application No. 16/918,491, filed on Jul. 1, 2020, now Pat. No. 11,922,304, which is a continuation of application No. PCT/US2020/019157, filed on Feb. 21, 2020.

(60) Provisional application No. 62/808,993, filed on Feb. 22, 2019.

(51) Int. Cl.
| | |
|---|---|
| *G06N 3/08* | (2023.01) |
| *G06F 9/48* | (2006.01) |
| *H04L 41/16* | (2022.01) |
| *H04L 49/351* | (2022.01) |

(52) U.S. Cl.
CPC ............. *G06N 3/08* (2013.01); *G06F 9/4843* (2013.01); *H04L 41/16* (2013.01); *H04L 49/351* (2013.01)

(58) Field of Classification Search
CPC ......... G06N 3/08; G06F 9/4843; H04L 41/16; H04L 49/351
See application file for complete search history.

(56) References Cited

U.S. PATENT DOCUMENTS

| | | | | |
|---|---|---|---|---|
| 11,570,257 | B1 * | 1/2023 | Tanach | .................. H04L 67/148 |
| 11,716,257 | B1 * | 8/2023 | Khermosh | .......... H04L 41/5096 |
| | | | | 709/224 |
| 11,915,041 | B1 * | 2/2024 | Tanach | .................. G06F 9/4881 |
| 11,922,304 | B2 * | 3/2024 | Tanach | .................. G06F 9/4843 |

(Continued)

FOREIGN PATENT DOCUMENTS

| | | |
|---|---|---|
| CN | 108718249 A | 10/2018 |

OTHER PUBLICATIONS

A Reconfigurable Fabric for Accelerating Large Scale Datacenter Services (Year: 2015).*

(Continued)

*Primary Examiner* — Shirley X Zhang
(74) *Attorney, Agent, or Firm* — M&B IP Analysts, LLC

(57) ABSTRACT

A remote artificial intelligence (AI) appliance system is provided. The system includes an artificial intelligence accelerator (AIA) switch; and a plurality of network attached artificial intelligence accelerator (NA-AIA) engines connected to the AIA switch; wherein each of the plurality of NA-AIA engines is configured to execute at least one processing AI task in response to a request received from at least one AI application server; wherein the AIA appliance server and the at least one application server are connected over a network connection; and wherein the AIA switch is configured to allow direct communication between at least one application server and the plurality of NA-AIA engines.

20 Claims, 6 Drawing Sheets

(56) References Cited

U.S. PATENT DOCUMENTS

| | | | |
|---|---|---|---|
| 2012/0303932 | A1 | 11/2012 | Farabet et al. |
| 2015/0324690 | A1 | 11/2015 | Chilimbi et al. |
| 2017/0357891 | A1 | 12/2017 | Judd et al. |
| 2017/0357910 | A1 | 12/2017 | Sommer et al. |
| 2018/0089562 | A1 | 3/2018 | Jin et al. |
| 2018/0218518 | A1 | 8/2018 | Yan et al. |
| 2018/0314941 | A1 | 11/2018 | Lie et al. |
| 2019/0042955 | A1 | 2/2019 | Cahill et al. |
| 2019/0312772 | A1* | 10/2019 | Zhao ..................... G06F 9/5011 |
| 2019/0325302 | A1* | 10/2019 | Savic ....................... G06N 3/08 |
| 2020/0142753 | A1* | 5/2020 | Harwood .............. G06F 9/4856 |
| 2020/0174840 | A1 | 6/2020 | Zhao et al. |
| 2021/0004658 | A1 | 1/2021 | Ziv et al. |
| 2023/0130964 | A1* | 4/2023 | Tanach ................... H04L 69/08 |
| | | | 709/227 |
| 2023/0327963 | A1* | 10/2023 | Khermosh ............ G06F 9/5038 |
| | | | 709/224 |
| 2024/0184624 | A1* | 6/2024 | Tanach ................... G06F 9/544 |
| 2024/0251016 | A1* | 7/2024 | Tanach ................. H04L 67/148 |

OTHER PUBLICATIONS

Wikipedia—AI Accelerator (Year: 2018).*
NVIDIA GPUDirect (Year: 2018).*
Parashar, et al., "SCNN: An Accelerator for Compressed-sparse Convolutional Neural Networks," Massachusetts, 2017, pp. 1-12.
The International Search Report and The Written Opinion of the International Searching Authority for PCT/US2020/019157, Date of Mailing: Jun. 25, 2020, ISA/RU, Moscow, Russia.

* cited by examiner

REMOTE ARTIFICIAL INTELLIGENCE (AI) ACCELERATION SYSTEM

CROSS-REFERENCE TO RELATED APPLICATIONS

This application is a continuation of U.S. patent application Ser. No. 16/918,491 filed on Jul. 1, 2020, which claims priority from an International Patent Application No. PCT/US2020/019157 filed on Feb. 21, 2020, which claims the benefit of U.S. Provisional Application No. 62/808,993 filed on Feb. 22, 2019, the contents of which are hereby incorporated by reference.

TECHNICAL FIELD

The disclosure generally relates to system architectures and, more specifically, to embedded computing architectures and reconfigurable computing architectures.

BACKGROUND

The demand and need for stronger, more scalable, higher capacity compute systems increases annually. This need and demand is due in a large part to the increased popularity of AI applications and their usage of machine learning and deep learning workloads. The execution of such applications is performed by servers configured as a dedicated AI infrastructure including hardware, software and AI-framework. The AI framework may be, for example, TensorFlow, Caffe2, Pytorch, or Microsoft® Cognitive Toolkit (CNTK), usually implementing the framework's APIs that are used by the application and implemented in either software, hardware or combined. The hardware typically includes a dedicated hardware accelerator device, also known as a deep learning accelerator (DLA) that is offloading deep learning tasks from the software running on the CPU.

FIG. 1 shows a schematic diagram of the architecture of a conventional local attached DLA system 100 for executing artificial intelligence (AI) applications. The system 100 is arranged as a local direct-attached DLA architecture, having a plurality of application servers 110 connected through an Ethernet switch 120. The Ethernet switch 120 directs and routes traffic among the application servers 110. An Ethernet switch 130 directs and routes traffic in and out of the system 100.

In the local direct-attached DLA architecture shown in FIG. 1, each application server 110 includes a network interface card (NIC) 111, a CPU 112 coupled to a memory 113. The CPU 112 is a host CPU being coupled to a DLA 114 having its memory (M).

The DLA 114 is typically an AI Accelerator designed to accelerate execution of specific AI functions used by AI applications, such as deep learning tasks or neural networks. The DLA 114 is typically realized as a graphics processing unit (GPU), a Field Programmable Gate Array (FPGA), or an Application-specific integrated circuit (ASIC). The DLA 114 is connected to the host-CPU 112 through a PCIe bus (not labeled). In the DLA system 100, an application is executed by the host-CPU 112, where deep-learning tasks are off-loaded to the DLA 114. The DLA 114 executes dedicated software and utilizes dedicated hardware in order to accelerate the execution of such tasks.

While the direct-attached architecture shown in FIG. 1 provides high performance and low latency, when using a shared memory architecture, the utilization of host-CPU 112 and DLA 114 is low. This is due to the load-balancing of two asynchronous workloads: (1) application workload running on the host-CPU 112 and (2) AI workload running on the DLA 114. The low utilization of the host-CPU and the DLA increases total cost of ownership (TCO) for the datacenter owner.

Another type of conventional architecture of a system for executing AI applications is a remote direct-attached DLA system. An example for such a system 200 is shown in FIG. 2.

The remote direct-attached DLA system 200 includes a plurality of application servers 210 and a DLA server 220 connected over a network switch 230. Each application server 210 executes an AI application over an AI software framework. Further, each application server 210 communicates with a DLA server 220 that executes specific deep-learning tasks. The DLA server 220 includes a host-CPU 221 executing the AI server application with its multi-client support, the network driver, the DLA driver, and other AI server related tasks. Such tasks include, but are not limited to, an AI framework and runtime APIs. The DLA server also includes a direct-attached DLA 222. The DLA 222 is the same as the DLA discussed above.

In an embodiment, the remote direct-attached DLA system 200 is configured to allocate the various workloads associated with the AI server to run on the host-CPU 221 and the deep-learning workload to run on the DLA 222. Some of the disadvantages of the system 200 are scalability cost and power. Specifically, when an additional DLA resource is needed, an additional DLA server 220 should be added to the system including the associated computing resources, such as CPU, NIC and memory. Another disadvantage of the system 200, is that the utilization of such a system should require an optimization and balance of the workloads running on the host-CPU and the DLA. However, the optimization may not be optimal if the workloads to be executed by the DLA server 220 are varied in their CPU-DLA balance of workload overhead.

As an example, if the data that needs to be processed in the DLA requires pre-processing (resizing, restructuring, or other functions), such tasks need to be allocated to the CPU and can cause a computation bottleneck in the CPU, lowering the effective utilization of the DLA.

In some configurations, the DLA server 220 is replaced with a DLA appliance server. An example architecture for a remote direct-attached DLA system 300 with a DLA appliance server 320 is shown in FIG. 3.

The DLA appliance server 320 includes a plurality of DLAs 321 coupled to a host-CPU 322 through a PCIe switch 323. The DLA appliance server 320 balances the workloads discussed above between the attached DLAs 321 and within each DLA 321.

However, the DLA appliance server 320, and thus the entire direct-attached DLA system 300 suffers from high latency due to data path and computation bottleneck between the host-CPU, its memory and the DLAs 321. The operation of the system 300 also requires multiple data copies between a memory of an application server 310 requesting, for example, a deep-learning task. The data copies are transferred from a memory of the host CPU 322 in the DLA appliance server 320 to the memory of a DLA 321 allocated to execute the requested deep-learning task. Further, data copies are transferred in the opposite directions, of each other, while sending the result back to the AI application. The multiple data copies increase the latency and power of the entire system.

It would be therefore an advantageous to provide an AI acceleration solution that would overcome the deficiencies mentioned above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, remote artificial intelligence may include an artificial intelligence accelerator (AIA) switch. Remote artificial intelligence may also include a plurality of network attached artificial intelligence accelerator (NA-AIA) engines connected to the AIA switch; where each of the plurality of NA-AIA engines is configured to execute at least one processing AI task in response to a request received from at least one AI application server; where the AIA appliance server and the at least one application server are connected over a network connection; and where the AIA switch is configured to allow direct communication between the at least one application server and the plurality of NA-AIA engines. Other embodiments of this aspect include corresponding computer systems, apparatus, and computer programs recorded on one or more computer storage devices, each configured to perform the actions of the methods.

In one general aspect, method may include receiving, from an application server, a request to execute an AI task, the request is received at an AI appliance server, where the request is copied directly from the application server to the AI appliance server over a network connection. The method may also include processing the received request by the AI appliance server. The method may furthermore include copying the processing results directly to the application server over the network connection. Other embodiments of this aspect include corresponding computer systems, apparatus, and computer programs recorded on one or more computer storage devices, each configured to perform the actions of the methods.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
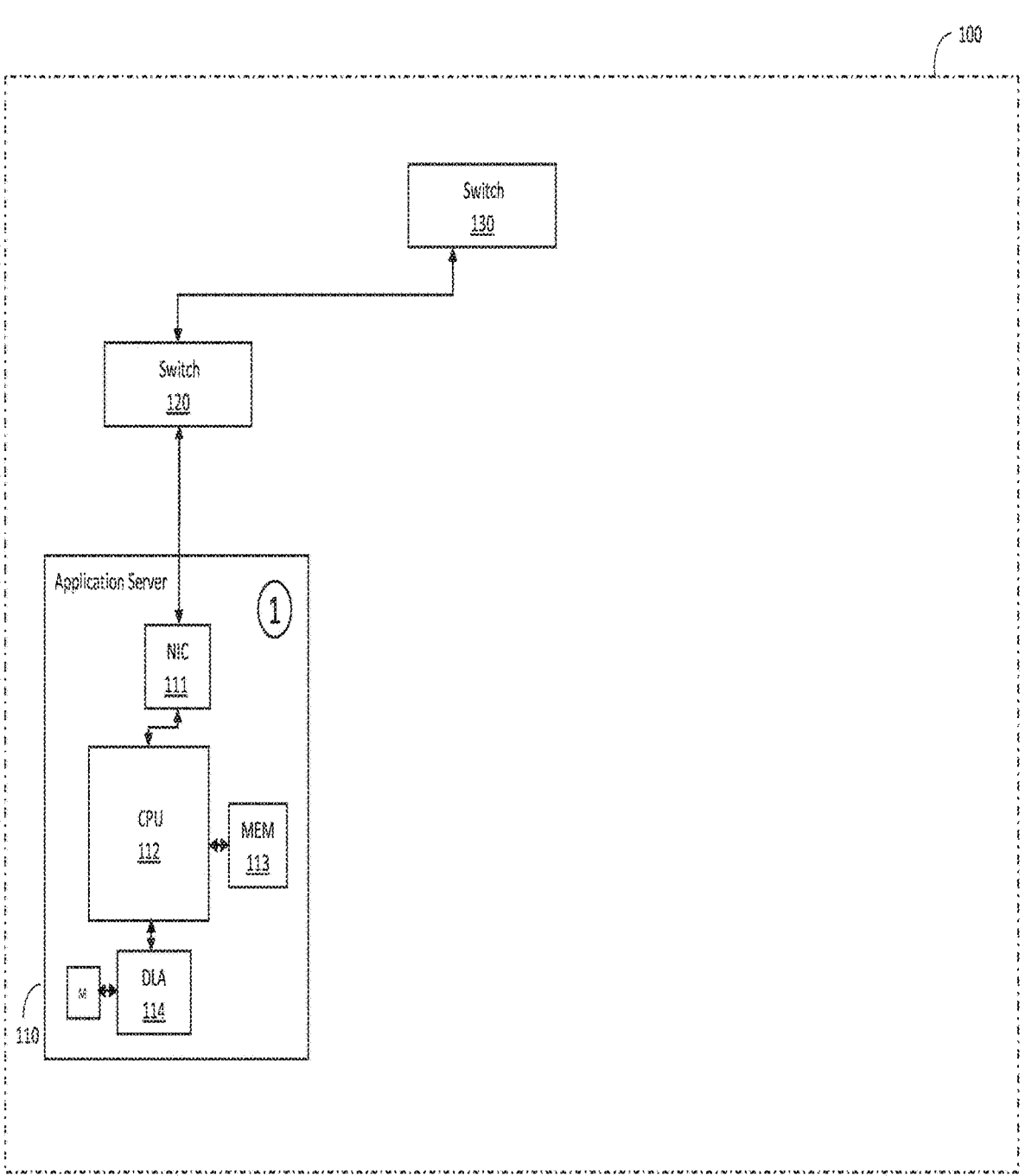
FIG. 1 is a schematic diagram of the architecture of a conventional local direct-attached DLA system.

The embodiments disclosed by the invention are only examples of the many possible advantageous uses and implementations of the innovative teachings presented herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Figure 2:
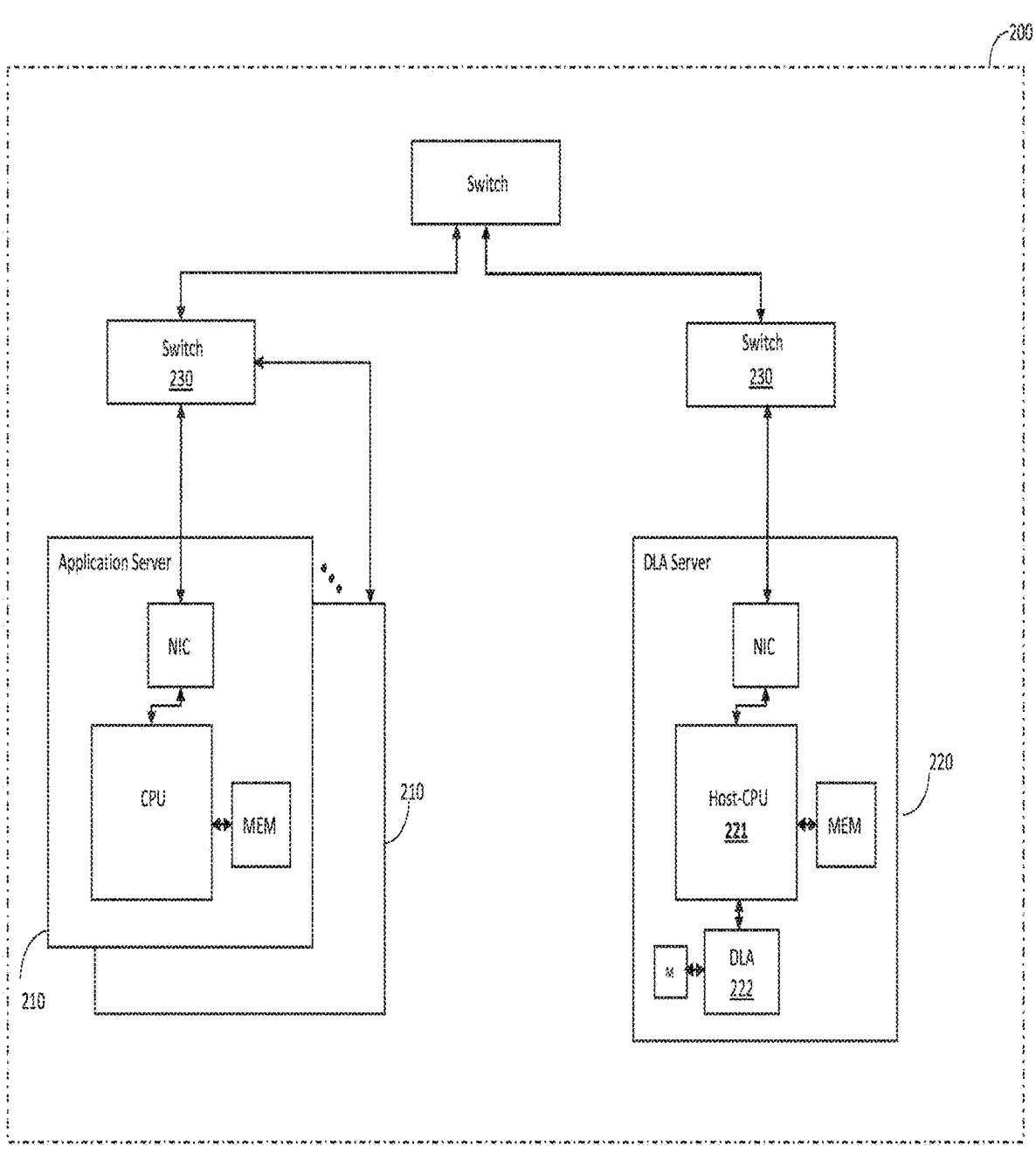
FIG. 2 is a schematic diagram of the architecture of a conventional remote direct-attached DLA system.
Figure 3:
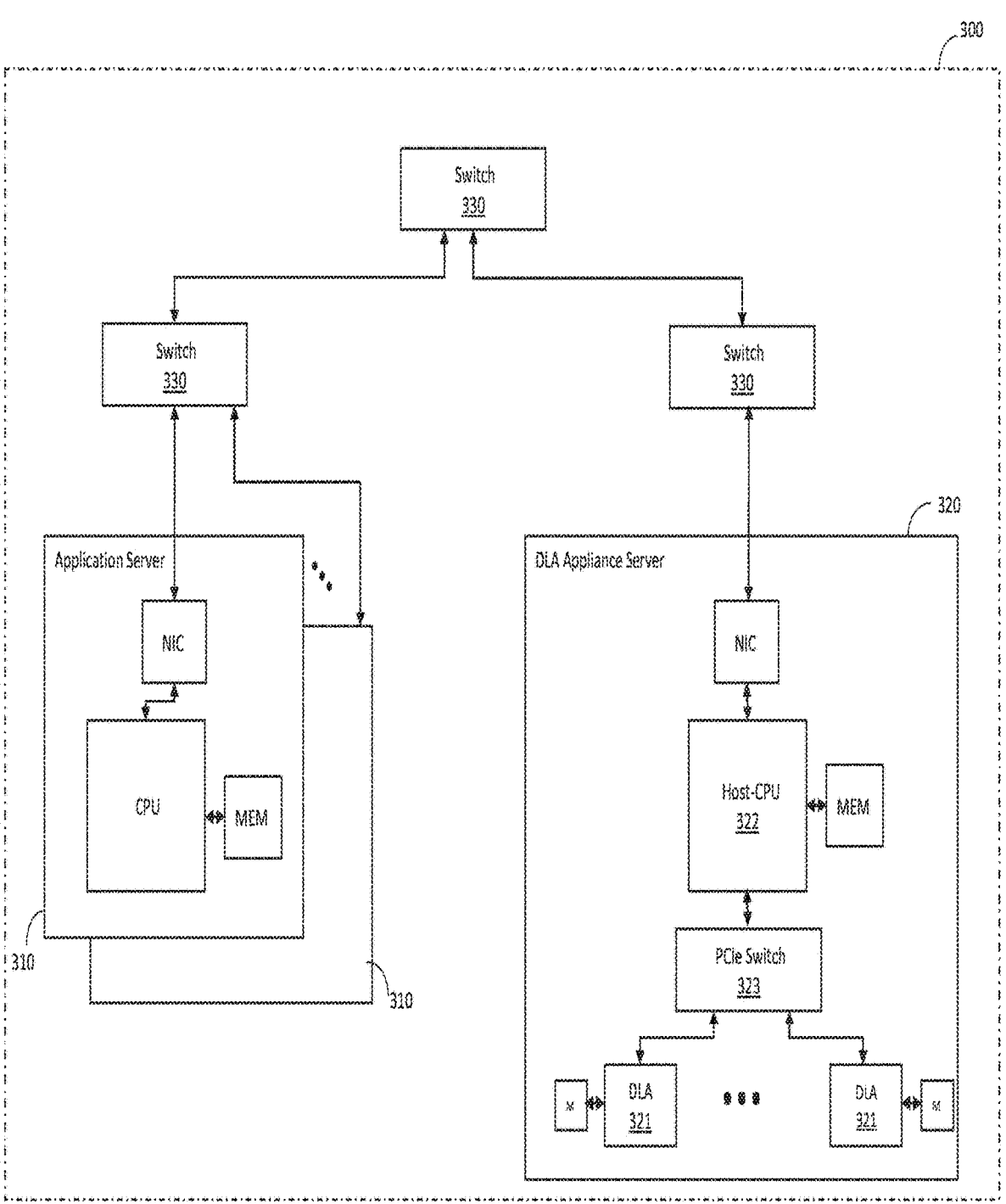
FIG. 3 is a schematic diagram of architecture of a conventional remote direct-attached DLA appliance server.

The various disclosed embodiments allow for the acceleration and execution of AI workloads, used in AI applications in, for example, datacenters while reducing the TCO for datacenters' owners, that are also translated to AI-as-a-Service cost model. Specifically, the disclosed embodiments eliminate the need to balance between workloads. The workloads are allocated to a host-CPU (e.g., the host-CPU in systems 200 and 300, FIGS. 2 and 3). The disclosed embodiments further allow the balance among deep-learning workloads running on an application server implementing the DL workloads (e.g. DLA or other). The disclosed embodiments overcome the deficiencies of applications discussed above.

In an embodiment, an AIA appliance server based on a network-attached AI accelerator (hereinafter "NA-AIA") engine is disclosed. The NA-AIA engine is a system on chip (SoC) or integrated circuitry (IC) providing AI computation and network capabilities that are required to transfer and compute the AI models and data (to be executed), in addition to the management, data path and control tasks associated with these offload requests of AI specific tasks, previously done partially by the host-CPU in systems 200 and 300. As will be demonstrated below, the NA-AIA engines remove the compute and communication bottlenecks, thus providing a scalable solution.

Figure 4:
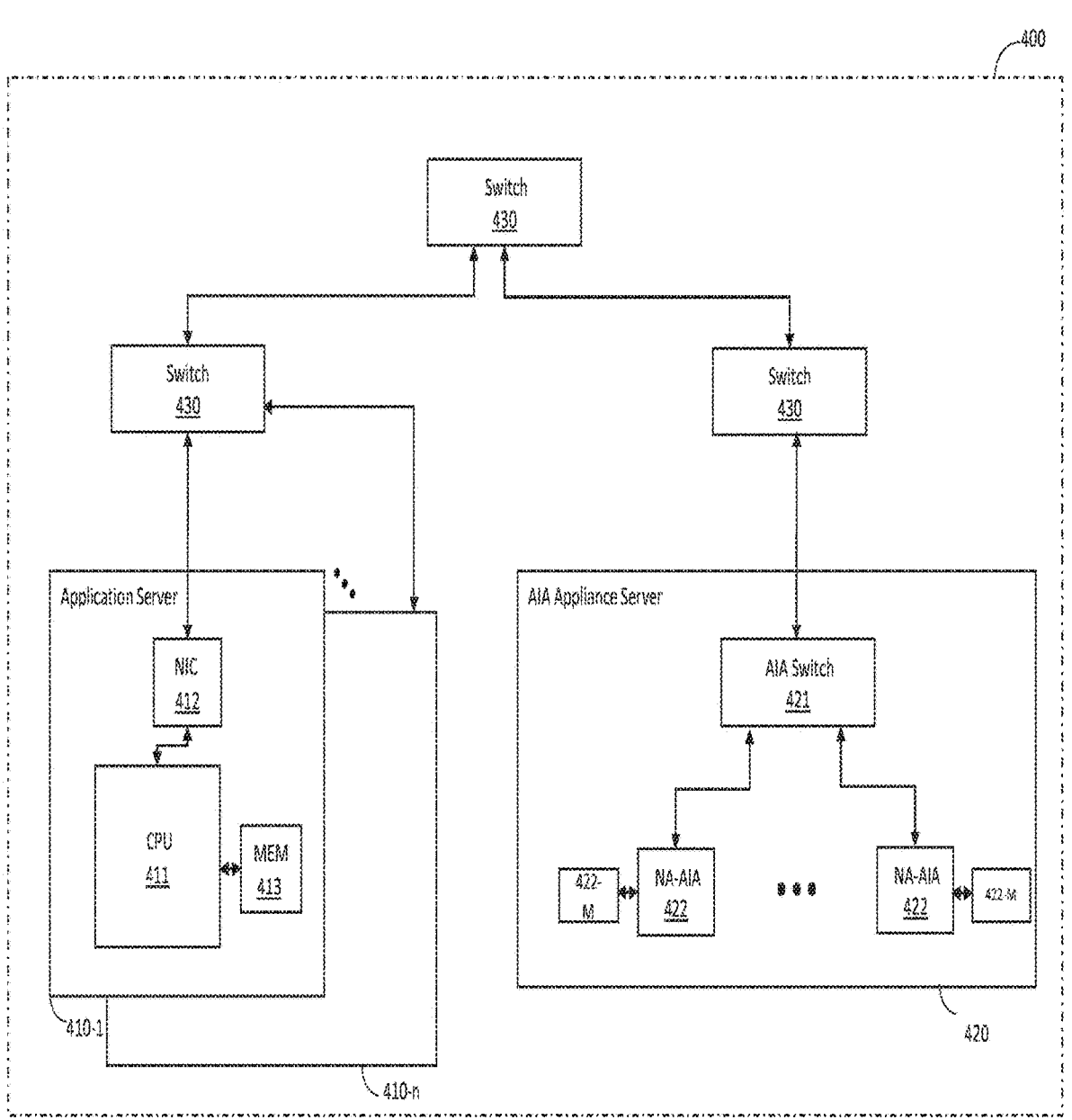
FIG. 4 is a schematic diagram of the architecture of a remote AI acceleration system appliance server arranged according to an embodiment.

FIG. 4 shows an example diagram of an architecture of a remote AI acceleration system 400 arranged according to an embodiment. The system 400 is utilized to accelerate the operations of AI processing tasks including, but not limited to, deep-learning tasks, neural networks, and the like.

The system 400 includes a plurality of application servers 410-1 through 410-n (collectively referred to as application server 410 or application servers 410), at least one AIA appliance server 420, and a number of switches 430 connecting the various components of the system 400. In an embodiment, each of the switches 430 is an Ethernet switch. In some configurations, the system 400 may include only one application server 410.

Each application server 410 is configured to execute an AI application over an AI software framework. Such a framework may be, for example, TensorFlow, Caffe2, Pytorch, or CNTK, and the like.

Each application server 410 further communicates with the AIA appliance server 420 that executes specific AI processing tasks. The AIA appliance server 420 is designed according to the disclosed embodiments to accelerate the execution of the AI tasks. The AIA appliance server 420 may include, in one configuration, a switch 421 (hereinafter a "AIA switch" 421) connected to a plurality of NA-AIA engines 422. Each NA-AIA engine 422 can potentially be coupled with its own memory 422-M. The AIA switch 421 may be an Ethernet switch.

The system 400 provides a scalable solution as there are no compute and communication bottlenecks. Specifically, in an embodiment, additional NA-AIA engines can be connected to the AIA switch 421, thereby expanding the AIA switch 421 to the AIA appliance server 420. The AIA switch 421 is configured to have enough ports and bandwidth to allow data traffic to be transferred flawlessly between the application servers 410 and the AIA appliance server 420 and the NA-AIA engines 422.

In an embodiment, further acceleration may be achieved by utilizing a proprietary protocol (AI over fabric, or AIoF). The AIoF protocol is a communication protocol designed to support installation and execution of AI models and AI operations, including but not limited, to deep-learning and Neural Networks. The AI models further include, but are not limited to, transferring the acceleration and offload requests, data, and responses. An AI model is a database of an AI computation graph including one or more functions. The function may include a Neural Network. The computation graph describes all the computation steps and connections between computation steps including the order of steps and interface between steps.

The AIoF protocol is designed to remove the network overhead, latency, and the multiple data copies required to transfer data from the application server 410 to the AIA appliance server 420 associated with the network protocol. Examples for such protocols include, but are not limited to, TCP, UDP, RDMA, and the like.

In an embodiment, the AIoF protocol can be configured using a shared memory over network, in which the application can use its memory while the hardware transparently copies the AI model or the data from the application memory to an NA-AIA engine's memory via the network and also copies the results and responses from the NA-AIA engine's memory to the application memory.

Specifically, in the arrangement disclosed in FIG. 4, data is copied only twice (instead of 4 times in conventional arrangements). A first data copy is from the application server host-CPU's memory 413 to an internal (or external) memory in the NIC 412. That is, copy of data is internally within the application server 410, typically over an PCIe bus (not shown). Then, the data is copied from the NIC's 412 memory to a memory 422-M associated with one NA-AIA engine 422. The data is copied from the application server 410 to the AIA appliance server 420 over the network with a fast network connection. Examples for such connections include, but are not limited to, Ethernet connection, TCP connection, RoCEv2, RDMA, and the like.

In an embodiment, the data provided by the application server 410 may include a higher-level description of a compute pipeline of tasks or a sequence of multiple compute pipelines of the AI application. The AIA appliance server 420, and specifically the NA-AIA engine 422 can potentially perform the entire compute pipeline of tasks, the complete AI sequence of compute pipelines and their associated data, and also the responses sent back to the application server 410 upon completion.

This demonstrates further optimization as the processing of specific compute pipeline tasks are not performed by the application server's or DLA appliance server's host-CPU. Further, the data is not copied between the application server and the DLA appliance server before and after any step of the AI pipeline or the AI sequence requests being processed. The flow of data and control between an application server 410 and the AIA appliance server 420 is discussed in FIG. 6.

For example, a virtual assistant application, such as Siri® by Apple®, Alexa® by Amazon®, and the like includes the following AI sequence: 1) voice recognition; 2) a natural language processing (NLP) processed to understand the context of the speech query; 3) a recommendation process that provide the result or answer; 4) a NLP process to phrase the recommendation (e.g., search results), and 5) a speech synthesis process to generate the speech. Reducing the latency and processing time of such sequences would dramatically improve the performance of such virtual assistance applications. Moreover, such applications are projected to reach ultra-scale, serving millions of users. Thus, the AI applications would incur very high cost of computation and are dependent on technologies that are expected to provide more affordable solutions such as described above.

It should be noted that the remote AI acceleration system 400 discussed herein can be implemented or otherwise integrated in a cloud computing platform, an on-premises data center or residential gateway or home access point, a decentralized computing infrastructure (fog computing), and the like. The cloud computing platform may include a public cloud, a private cloud, or a hybrid cloud.

According to the disclosed embodiments, the system 400 can support the execution of any AI application. Examples for such application include cyber-security applications, speech recognition, object detections, digital payments, image recognition, IoT applications, educational applications, medical applications, automotive applications, ecommerce applications, chatbots and other bots applications and the like. The nature of the application would not change the arrangement of the system 400.

Figure 5:
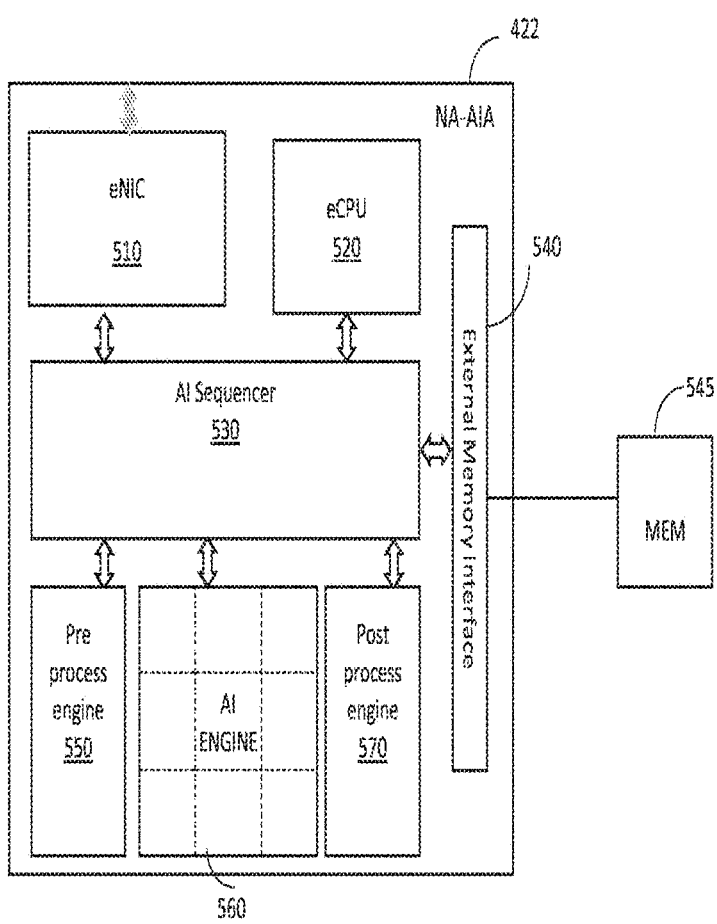
FIG. 5 is an example block diagram of a network-attached AI accelerator according to an embodiment.

FIG. 5 shows an example block diagram of an NA-AIA engine 422 according to an embodiment. The NA-AIA engine 422 includes a network interface controller (eNIC) 510, a processing circuitry (eCPU) 520, an AI sequencer 530, and an external memory interface 540 coupled to a memory 545. In some embodiments, the memory 545 may be part of the NA-AIA engine 422 and may include machine-readable media for storing software. Software shall be construed broadly to mean any type of instructions, whether referred to as software, firmware, middleware, microcode, hardware description language, or the like. Instructions may include code (e.g., in source code format, binary code format, executable code format, or any other suitable format of code). The instructions, when executed by the one or more processors, cause the processing circuitry 520 to perform the various functions described in further detail herein.

The memory 545 may be a volatile memory such as, but not limited to random access memory (RAM), DRAM, or non-volatile memory (NVM), such as, but not limited to, flash memory.

In an embodiment, the processing circuitry 520 may be, or be a component of, a larger processing unit implemented with one or more processors. The processing circuitry 520 may be realized as one or more hardware logic components and circuits. For example, and without limitation, illustrative types of hardware logic components that can be used include external, non-embedded solutions such as: a CPU, field programmable gate arrays (FPGAs), application-specific integrated circuits (ASICs), application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

According to the disclosed embodiments, the NA-AIA engine includes a pre-processing engine 550, a post-processing engine 570, and at least one AI engine 560. The pre-processing engine 550 and the post-processing engine 570 may be realized as DSP. The AI engine 560 can support, in an example embodiment, processing of specific AI and deep-learning tasks.

For example, the AI engine 560 may be configured to train and create neural networks, such as DNN, CNN, RNN or to infer based on existing pre-trained neural networks. The pre-processing engine 550 can be utilized to support processing of tasks that are not related to neural networks, neuromorphic computing, or other AI functions. Such processing may be performed prior to, after or between other neural network functions to be executed on the AI engine 560. Examples for non-NN AI tasks and functions are, but are not limited to, JPEG image decoding, MPEG video decoding, Resizing, Rendering, Input data modifications, Buffer restructuring, Image processing, Voice processing, Text manipulation, Rule based decision making or data modifications.

In an embodiment, the post-processing engine 570 can perform functions that are not neural network related. Examples for such function include, but are not limited to: image processing, mathematical equations processing, rule based decision making or data modifications, resizing, rendering, output data modifications, buffer restructuring, image processing, voice processing, and text manipulation.

In some embodiments, the eNIC 510 may have remote direct memory access (RDMA) capabilities. The eNIC 510 is operative for allowing the NA-AIA engine 422 to connect to the AIA switch (e.g., switch 421, FIG. 4). In an embodiment, the eNIC 510 is further configured to support communication and acceleration of data transfer via the AIoF protocol discussed above. In the configuration illustrated, communication is performed over the network using a RDMA communication protocol. It should be noted that other communication protocols are applicable, such as, but not limited to, RDMA, RoCEv2, TCP, Ethernet, and the like. In an embodiment, the eNIC 510 is an embedded NIC (eNIC).

The AI sequencer 530 is configured to control and manage the pipeline of tasks of jobs between an input direct memory access (DMA) of a packet processor, an external memory interface 540, and the various processing components of the NA-AIA engine 422. The packet processor is part of the eNIC 510.

In an embodiment, the AI sequencer 530 performs the tasks related to queue management between the various requests from various clients, scheduling of jobs and tasks within jobs, and chaining between the processing elements. The sequencer 530 may further perform operations related to stitching the results between processing elements before feeding them to other processing elements. In general, the sequencer 530 is configured to manage and control the data path between the processing elements and other components in the system without the intervention of software.

According to some embodiments, the AI sequencer 530 supports execution of deep-neural-network tasks, such as CNN, RNN, LSTM, and the like; Pre and post and intermediate processing; a multi computation graph support, and intra-chip/inter-chip computation graph partitioning (multi-dimensional); intra-chip/inter-chip computation graph chaining (pipelining and sequencing); queue management; and a scheduler.

In an example, the NA-AIA engine 422 can be realized as an FPGA, an ASIC, a system-on-a-chip system (SoC), and the like.

Figure 6:
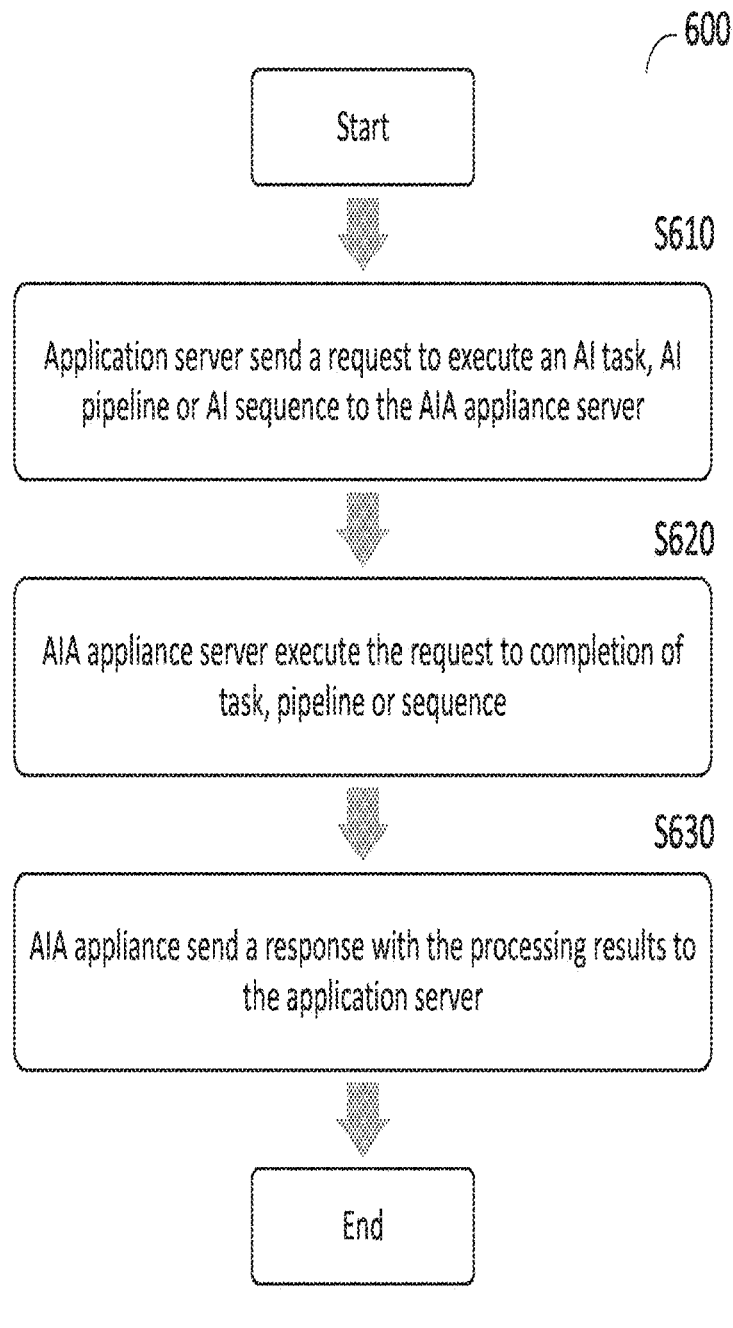
FIG. 6 is an example flowchart of a method for accelerating the operations of AI processing tasks according to an embodiment.

FIG. 6 shows an example flowchart 600 of a method for accelerating the operations of AI processing tasks according to an embodiment. At S610, a request to execute a specific AI task or AI pipeline or AI sequence, originated in the AI application is sent by the application server 410 and received by the AIA appliance server 420. The request may include a sequence of AI tasks or part of the sequence. As provided above, an AI sequence above may include 1) voice recognition; 2) a natural language processing (NLP) processed to understand the context of the speech query; 3) a recommendation process that provides the result or answer; 4) a NLP process to phrase the recommendation (e.g., search results), and 5) a speech synthesis process to generate the speech. Thus, the request sent at S610 may include the entire exemplary sequence or only one task of such sequence.

The request sent at S610, may include the data required to execute the AI task or AI sequence. The data is copied to a memory (422-M) allocated to an engine 422 assigned to execute the task. The data is copied over a fast network connection, examples of which are provided above.

At S620, the requested AI task is being processed by the NA-AIA assigned for this task. The processing as performed by the NA-AIA engine is discussed with reference to FIG. 5. It should be appreciated that the NA-AIA engine is an SoC with an embedded CPU and NIC, which allows the acceleration of the processing of the AI tasks.

At S630, the processing results are returned to the application server also over the fast connection. In an embodiment, the results are copied directly from the AIA appliance server 420 (from the NA-AIA engine) to the application server 410. It should be appreciated that the data is copied only once from the server 410 to the appliance 420 over a fast connection and only once on the way back.

The embodiments disclosed herein can be implemented as hardware, firmware, software, or any combination thereof. The application program may be uploaded to, and executed by, a machine comprising any suitable architecture. Examples of such architectures are discussed above with reference to at least FIGS. 4 and 5. Generally, such a machine may be implemented on a computer platform having hardware such as one or more central processing units ("CPUs"), memory, and input/output interfaces.

The computer platform may also include an operating system and microinstruction code. The various processes and functions described herein may be either part of the microinstruction code or part of the application program or any combination thereof, which may be executed by a CPU, whether or not such computer or processor is explicitly shown.

In addition, various other peripheral units may be connected to the computer platform, such as an additional network fabric, network interface card or device, storage unit, and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to the first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone, C alone; A and B in combination, B and C in combination; A and C in combination; or A, B, and C in combination.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions.

What is claimed is:

1. A remote artificial intelligence (AI) appliance system, comprising:
  an artificial intelligence accelerator (AIA) switch; and
  a plurality of network attached artificial intelligence accelerator (NA-AIA) engines, within an AIA appliance server, connected to the AIA switch;
    wherein each of the plurality of NA-AIA engines is configured to execute at least one AI processing task in response to a request received from at least one AI application server;
    wherein the AIA appliance server and the at least one AI application server are connected over a network connection;
    wherein the AIA switch is configured to allow direct communication between at least one AI application server and the plurality of NA-AIA engines;
    wherein each of the plurality of the NA-AIA engines is realized as a system on chip (SoC); and
  wherein each of the plurality of the NA-AIA engines comprises:
    a network interface controller (NIC),
    a processing circuitry;
    an AI sequencer; and
    a memory.

2. The system of claim 1, wherein the AIA appliance server further comprises:
  a plurality of memory units, each of the plurality of memory units is coupled to a respective NA-AIA engine of the plurality of NA-AIA engines.

3. The system of claim 2, wherein data of the at least one requested AI processing task is copied from the at least one application server to a memory associated with a first NA-AIA engine in the AIA appliance server.

4. The system of claim 3, wherein the data is copied to the first NA-AIA engine in response to the requested at least one AI processing task by the AIA appliance server.

5. The system of claim 4, wherein data of processing results are directly copied from the first NA-AIA engine to the application server.

6. The system of claim 1, wherein the AI processing task includes an AI sequence of jobs or functions.

7. The system of claim 1, wherein an NA-AIA engine of the plurality of NA-AIA engines is connected to the AIA switch on demand.

8. The system of claim 1, wherein each of the plurality of the NA-AIA engines further comprises:
  an AI engine configured to control and manage a pipeline of processing the requested at least one AI processing task;
  a pre-processing engine configured to perform pre-processing of functions that are not neural network related; and
  a post-processing engine configured to perform post-processing of functions that are not neural network related.

9. The system of claim 1, wherein the network connection between AIA appliance server and the at least one AI application server includes any one of: Ethernet connection, TCP connection, RoCEv2, and RDMA.

10. The system of claim 9, wherein a protocol utilized to copy data over the network connection is an AIoF protocol, wherein the AIoF protocol is a communication protocol designed to support installation and execution of AI models and AI operations.

11. A remote artificial intelligence (AI) appliance system, comprising:
  an artificial intelligence accelerator (AIA) switch; and
  a plurality of network attached artificial intelligence accelerator (NA-AIA) engines, within an AIA appliance server, connected to the AIA switch;
    wherein each of the plurality of NA-AIA engines is configured to execute at least one AI processing task in response to a request received from at least one AI application server;
    wherein the AIA appliance server and the at least one AI application server are connected over a network connection;
    wherein the AIA switch is configured to allow direct communication between at least one AI application server and the plurality of NA-AIA engines;
    wherein each of the plurality of the NA-AIA engines comprises:
    a network interface controller (NIC),
    a processing circuitry;
    an AI sequencer; and
    a memory; and
    wherein each of the plurality of the NA-AIA engines further comprises:
    an AI engine configured to control and manage a pipeline of processing the requested at least one AI processing task;
    a pre-processing engine configured to perform pre-processing of functions that are not neural network related; and
    a post-processing engine configured to perform post-processing of functions that are not neural network related.

12. The system of claim 11, wherein the AIA appliance server further comprises:
  a plurality of memory units, each of the plurality of memory units is coupled to a respective NA-AIA engine of the plurality of NA-AIA engines.

13. The system of claim 12, wherein data of the at least one requested AI processing task is copied from the at least one application server to a memory associated with a first NA-AIA engine in the AIA appliance server.

14. The system of claim 13, wherein the data is copied to the first NA-AIA engine in response to the requested at least one AI processing task by the AIA appliance server.

15. The system of claim 14, wherein data of processing results are directly copied from the first NA-AIA engine to the application server.

16. The system of claim 11, wherein the AI processing task includes an AI sequence of jobs or functions.

17. The system of claim 11, wherein an NA-AIA engine of the plurality of NA-AIA engines is connected to the AIA switch on demand.

18. The system of claim 11, wherein each of the plurality of the NA-AIA engines is realized as a system on chip (SoC).

19. The system of claim 11, wherein the network connection between AIA appliance server and the at least one AI application server includes any one of: Ethernet connection, TCP connection, RoCEv2, and RDMA.

20. The system of claim 19, wherein a protocol utilized to copy data over the network connection is an AIoF protocol, wherein the AIoF protocol is a communication protocol designed to support installation and execution of AI models and AI operations.

\* \* \* \* \*